United States Patent
Andriotis et al.

(10) Patent No.: US 6,439,852 B1
(45) Date of Patent: Aug. 27, 2002

(54) FAN WIRE GUARD WITH CIRCUMFERENTIAL WIRE SUPPORT MECHANISM

(75) Inventors: John C. Andriotis, Tiskilwa; Manzar Khoshnevissan, Peoria; Bruce W. Miers, Metamora; Jeffery M. Othman, Peoria, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/460,823

(22) Filed: Dec. 14, 1999

(51) Int. Cl.⁷ .............................................. F04D 29/70
(52) U.S. Cl. ................ 416/247 R; 415/121.2; 416/247 A
(58) Field of Search ................ 415/121.2; 416/247 R, 416/1, 247 A; 52/668, 667, 663; 29/897.15

(56) References Cited

U.S. PATENT DOCUMENTS

| | | | |
|---|---|---|---|
| 1,540,788 A | * 6/1925 | McClure | 52/799.12 |
| 1,914,253 A | 6/1933 | Green | |
| 1,941,396 A | 12/1933 | Green | |
| 1,988,118 A | 1/1935 | Green | |
| 2,071,673 A | * 2/1937 | Whitlock | 52/667 |
| 2,601,947 A | 7/1952 | Buttner | |
| 3,402,882 A | 9/1968 | Militello | |
| 3,942,764 A | * 3/1976 | Beversdorf | 52/667 |
| 4,221,038 A | * 9/1980 | Singer et al. | 29/897.15 |
| 4,282,695 A | * 8/1981 | Lew | 52/668 |
| 4,761,930 A | * 8/1988 | Tepera | 52/668 |
| 4,818,183 A | 4/1989 | Schaefer | |
| 5,601,412 A | 2/1997 | Vice | |
| 5,813,187 A | * 9/1998 | Lee | 52/667 |
| 6,036,444 A | * 3/2000 | Barney et al. | 416/247 R |

* cited by examiner

Primary Examiner—Edward K. Look
Assistant Examiner—Richard Woo
(74) Attorney, Agent, or Firm—Blackwell Sanders Peper Martin LLP

(57) ABSTRACT

A protective guard for use with a fan or other mechanism includes main support members, perimeter support members, main screen members, and perimeter screen members with joints formed between the support members and screen members to inhibit access thereto. The support members define openings through which the screen members slidably extend to form the joints without welds. In one embodiment, the support members include unitary bars. In another embodiment, the support members comprise first and second bars having legs, which define recesses. When the upper and lower bars are attached, the recesses define openings through the support members for receiving the screen members.

22 Claims, 6 Drawing Sheets

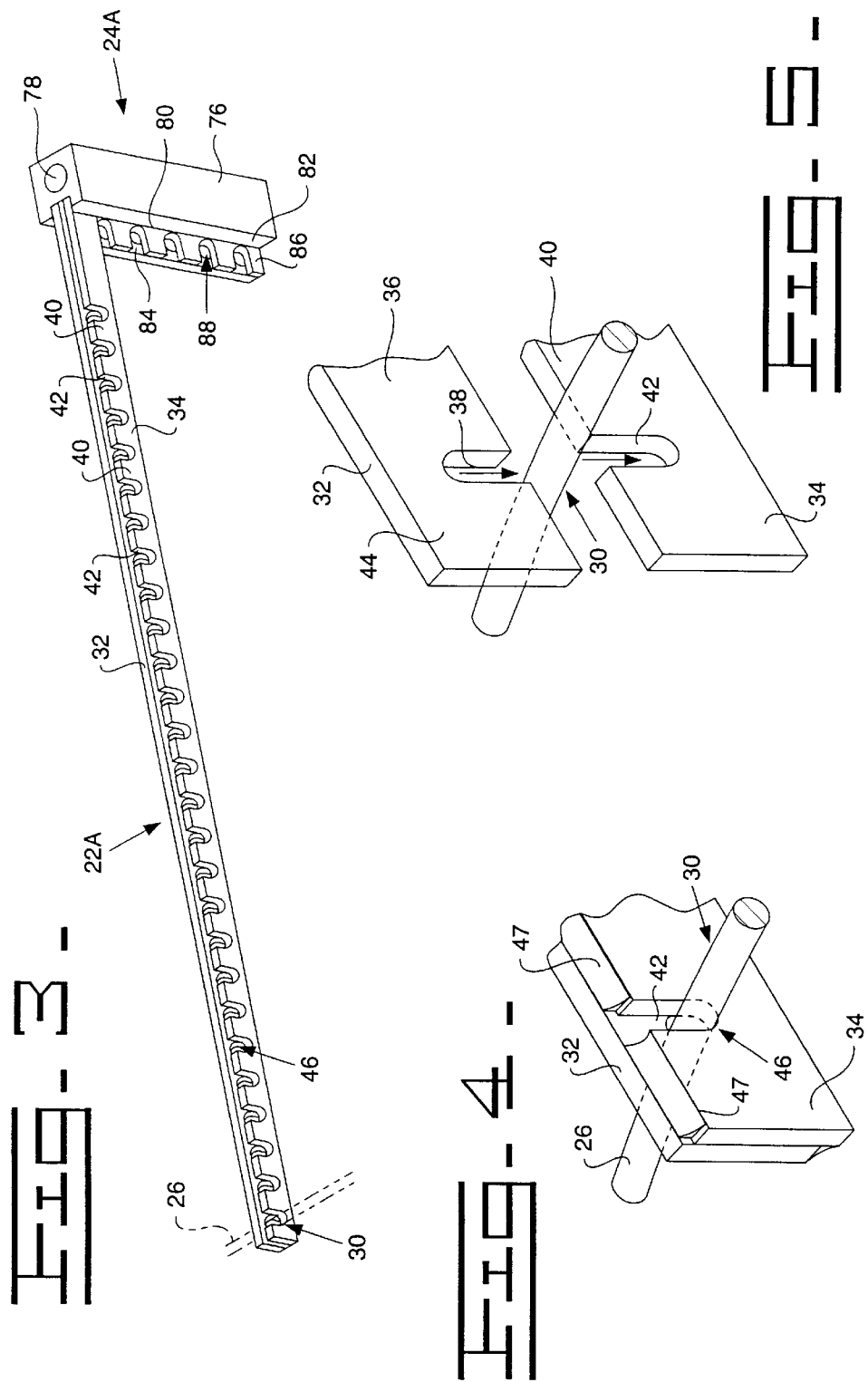

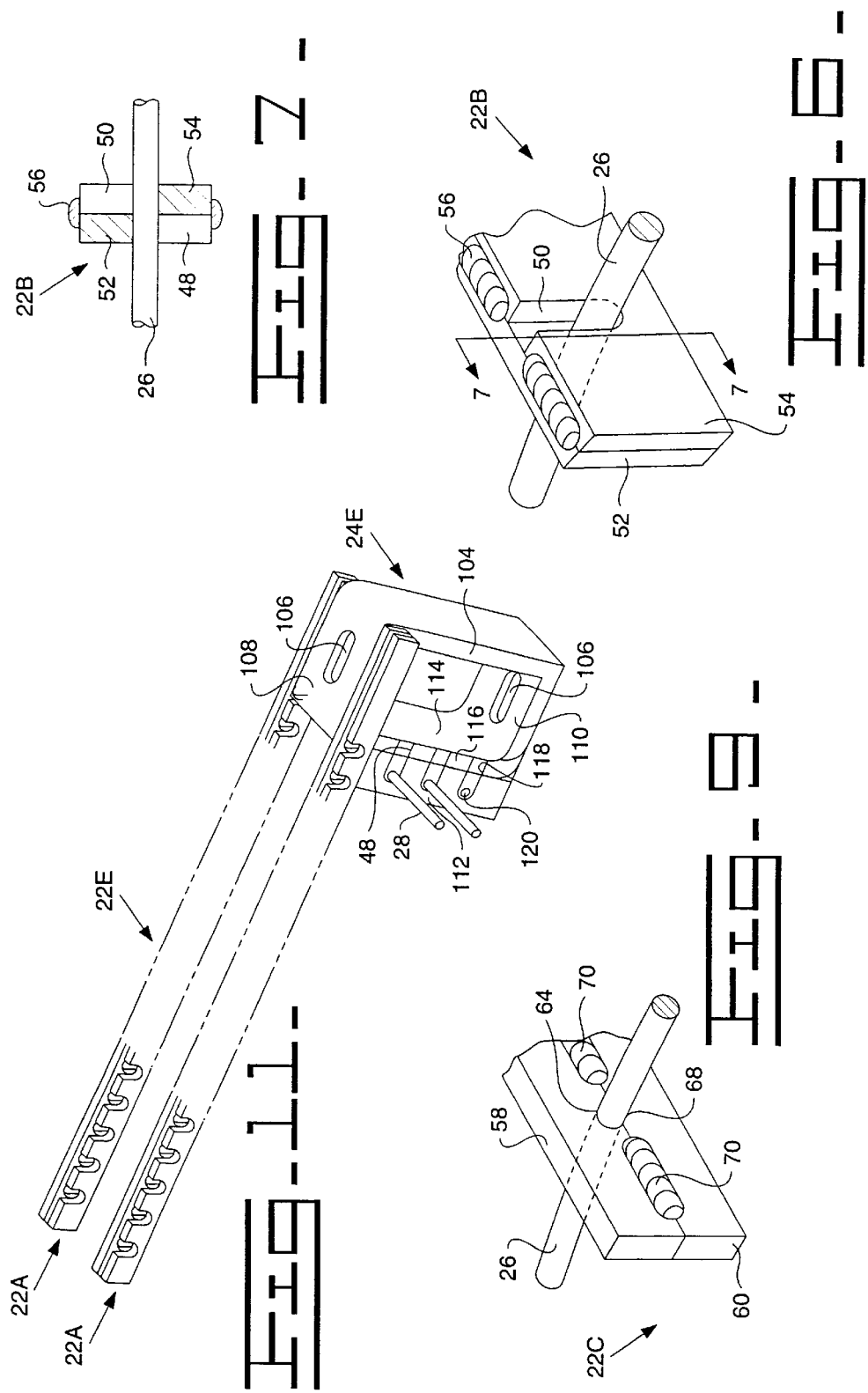

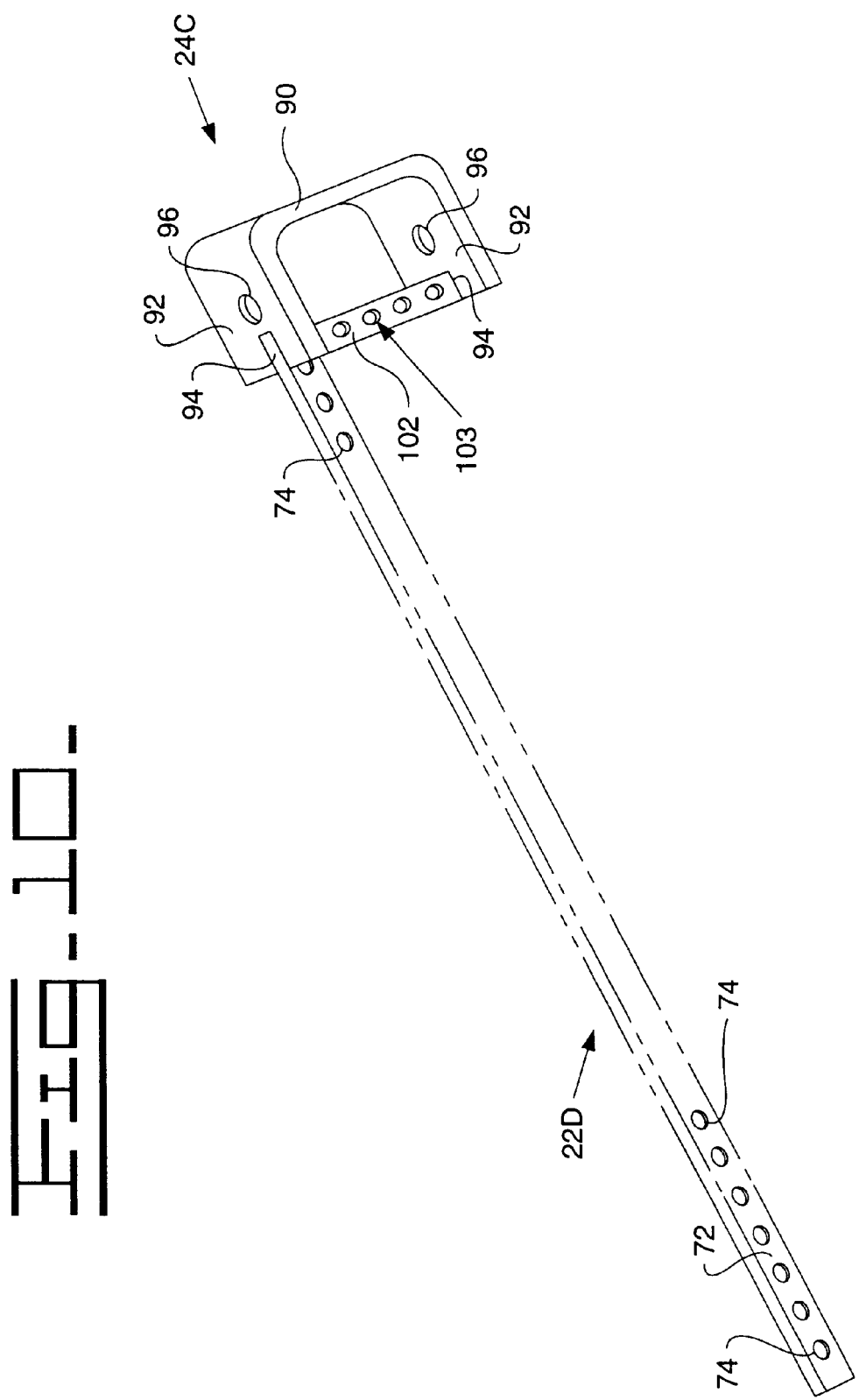

FAN WIRE GUARD WITH CIRCUMFERENTIAL WIRE SUPPORT MECHANISM

TECHNICAL FIELD

This invention relates generally to protective guards for apparatus with moving and/or extreme temperature components and, more particularly, to protective wire guards for rotating fan blades.

BACKGROUND ART

A wide variety of work machines, including construction and excavation work machines, are used for various construction and development purposes. In the operation of these work machines, potentially intense heat is generated as a natural by-product of the drive engine and other mechanisms associated with these work machines. To sustain optimum performance, the engine and other mechanisms are operated within determined temperature limits. Thus, it is necessary to dissipate the heat generated during operation of the drive engine and other mechanisms, and a wide variety of cooling systems have been developed to dissipate heat in these work machines.

Typically, an air circulation device, such as a fan, is installed with a plurality of heat exchanger cores having fins positioned in the path of the airflow from the fan to dissipate the heat generated. To inhibit injury, a low impedance guard preferably covers the fan blades. Known guards utilize a mesh of spaced wires to cover at least the downstream side of the fan and inhibit access to the fan blades. In one mesh arrangement, a plurality of radial wires support a plurality of concentric circular wires which incrementally decrease in diameter toward the center of the fan. Welds are typically used to interconnect the radial wires with the circular wires to form welded joints where the wires intersect.

As the wires are welded together, microscopic cracks are formed in the welds and adjacent wires. Over time, the vibration, heat, and deflection inherent in the operation of the fan and adjacent systems cause the cracks to grow and spread until the welds or the wires themselves are compromised allowing the wires to separate and impair the safety function of the guard. Additionally, the separated wires rattle creating undesirable noise. Thus, the wire guards fail after an undesirably short operational period leading to increased replacement, repair, and maintenance costs.

Other attempts to address these concerns have utilized independent clips to connect the wires, and others have used bendable tabs extending from the guard members. However, the bends in the tabs exhibit failure similar to the welds when exposed to the vibration and deflection inherent in the fan operation, and the use of clips appreciably raises the cost of the guard and allows undesirably high relative movement, which increases noise.

It is therefore desirable to increase the operational life of fan guards, to reduce fan guard maintenance and repair costs, and to attenuate noise emitted by fan guards.

Accordingly, the present invention is directed to overcoming one or more of the problems as set forth above.

DISCLOSURE OF THE INVENTION

In one aspect of the present invention, a guard for inhibiting access to moving components of a mechanism is disclosed. The guard includes a plurality of substantially rigid support members having support member bodies, a plurality of substantially rigid screen members having screen member bodies, and a plurality of joints between the support members and the screen members, the joints including openings through at least a selected plurality of the plurality of support member bodies and the plurality of screen member bodies and another plurality of the plurality of support member bodies and the plurality of screen member bodies extending through the openings.

In another aspect of the present invention a method of assembling a wire guard including a plurality of first bars defining first recesses, a plurality of second bars, and a plurality of screen members for inhibiting access to moving components of a mechanism is disclosed. The method includes inserting the screen members into the first recesses of the first bars, and attaching the second bars to the first bars to hold the screen members in the first recesses.

BRIEF DESCRIPTION OF THE DRAWINGS

For a better understanding of the present invention, reference may be made to the accompanying drawings in which:

FIG. 3 is a perspective view of an overlapping support member of the fan guard of FIG. 1;

FIG. 4 is an exploded, fragmentary, perspective view of the support member and a joint of the fan guard of FIG. 1;

FIG. 5 is a fragmentary, perspective view of the support member and joint of FIG. 4;

FIG. 6 is a fragmentary, perspective view of an alternate support member and joint;

FIG. 7 is a transverse cross-sectional view of the support member and joint of FIG. 6 taken along line 7—7 in FIG. 6;

FIG. 9 is a fragmentary, perspective view of the abutting support member of FIG. 8;

FIG. 10 is a perspective view of a further alternate unitary support member according to the present invention; and FIG. 11 is a perspective view of a still further alternate double support member according to the present invention.

BEST MODE FOR CARRYING OUT THE INVENTION

Figure 1:
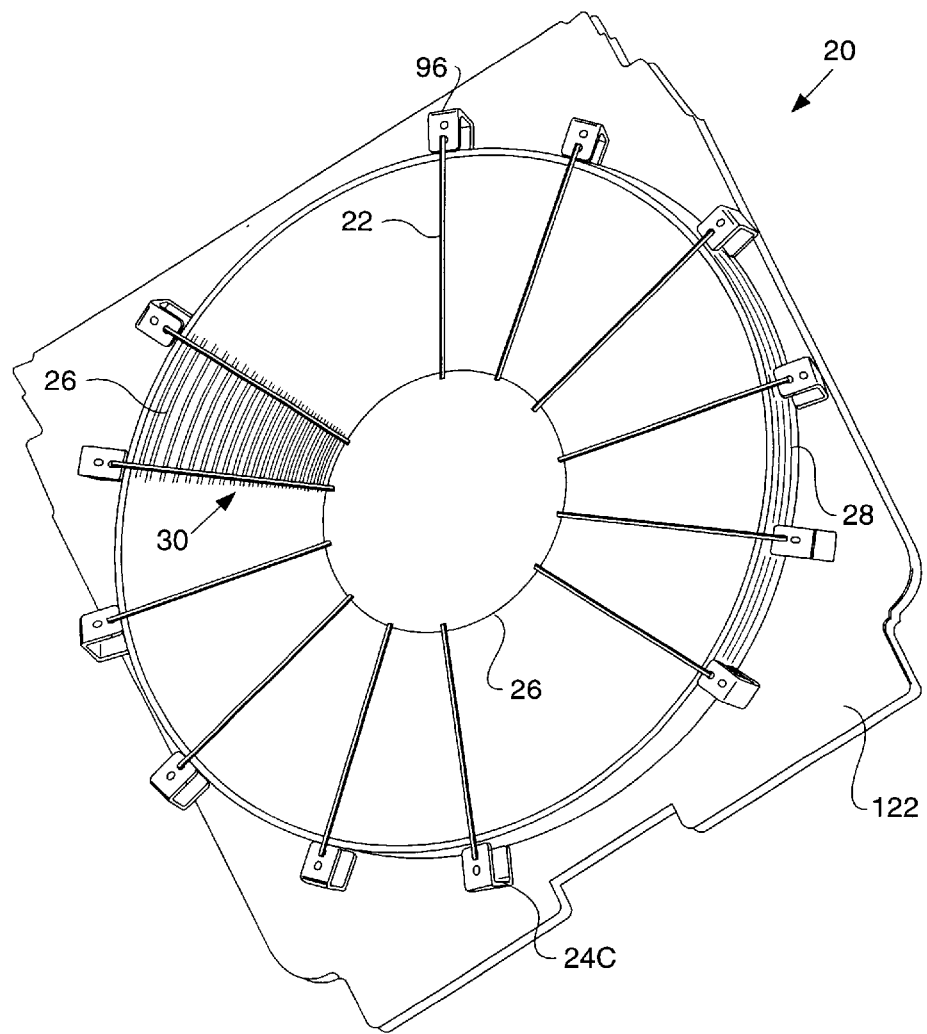
FIG. 1 is a top perspective view of a fan guard according to the present invention mounted on a support surface.
Figure 2:
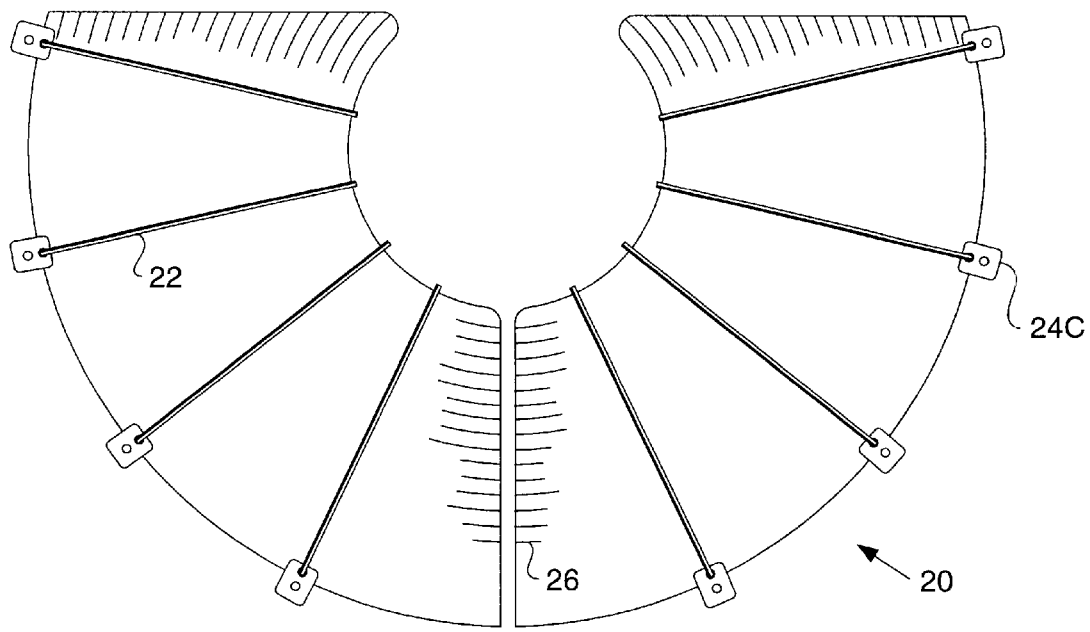
FIG. 2 is a fragmentary top perspective view of the fan guard of FIG. 1.

Referring to the drawings in greater detail, FIGS. 1 and 2 show a fan guard 20 according to the present invention. The fan guard 20 includes a plurality of main support members 22, perimeter support members 24, main screen members 26, and perimeter screen members 28. To enhance safety, the guard 20 is used to cover a mechanism (not shown) having moving or extreme temperature components such as a fan or heat exchanger. To increase the operational life of the guard 20, the screen members 26, 28 are joined without welds to the support members 22, 24 at joints 30.

The main and perimeter support members 22, 24 are provided in several unique embodiments, which will be differentiated by the suffixes A, B, C, D, and E. The different embodiments will be described to the extent of their unique features. Because the support members of the respective embodiments are substantially identical, they will be described with reference to one of the support members of that embodiment using identical reference numerals for related features.

Referring to FIGS. 3, 4 and 5, the lap weld main support member 22A is substantially rigid and preferably extends along a radial line. The main support member 22A includes a generally rectangular upper bar 32 and a generally rectangular lower bar 34. The upper bar 32 has a plurality of equally spaced upper legs 36 defining a plurality of equally spaced upper recesses 38 extending approximately half way through the height of the upper bar 32, so that the bar has a comb like configuration. Preferably, the recesses are slot shaped having rectangular portions extending inwardly from the edge and terminating in arcuate portions. The rectangular portions of the recesses preferably extend less than half way through the height of the bar.

The lower bar 34 is preferably identical to the upper bar 32, so that the lower bar 34 is an inverted upper bar 32. Thus, the lower bar 34 also includes lower legs 40 and lower recesses 42 extending in an opposite direction to the upper legs and recesses, and only a single bar configuration is manufactured lowering production cost. The upper and lower legs 36, 40 and the upper and lower recesses 38, 42 are aligned, and main screen members 26 are positioned between the bars at the aligned pairs of upper and lower recesses. The bars are then pushed together, so that inwardly facing sides 44 of the bars 32, 34 are juxtaposed; and the arcuate portions of the recesses engage the screen members 26. Further, the upper legs 36 and recesses 38 overlap the lower legs 40 and recesses 42, respectively, so that the overlapping portions of the recesses 38, 42 define main openings 46 through the upper and lower bars of the support member 22. Specifically, the arcuate portions of the recesses overlap to form the substantially circular main openings 46 through which the screen members 26 slidably extend to form the joints 30, and the main openings 46 are positioned along a longitudinal centerline of the support member. Thus, the openings preferably extend centrally through the support member body in contrast to providing the openings through tabs extending from the body of the support member.

With the legs and recesses overlapping, the lower legs are welded to the upper bar, and the upper legs are welded to the lower bar. Because the rectangular portions of the recesses extend less than half way into the bars, the edges of the bars are offset to form lap welds 47 between the upper and lower bars. The lap welds 47 are larger and stronger than welds formed directly with the screen members. Therefore, the screen members 26 are joined with the support member without welds being applied directly between the screen members and the support member to extend operational life. No weld is placed directly onto the main screen members 26.

Referring to FIGS. 6 and 7, an edge weld alternate main support member 22B utilizes slot shaped upper recesses 48 and slot shaped lower recess 50 each having rectangular portions which extend half way through the height of the upper and lower bars 52, 54. Because the rectangular portions extend half way, the edges of the bars 52, 54 are aligned to form edge welds 56 between the bars. Here again, no weld is applied directly onto the main screen members 26.

Figure 8:
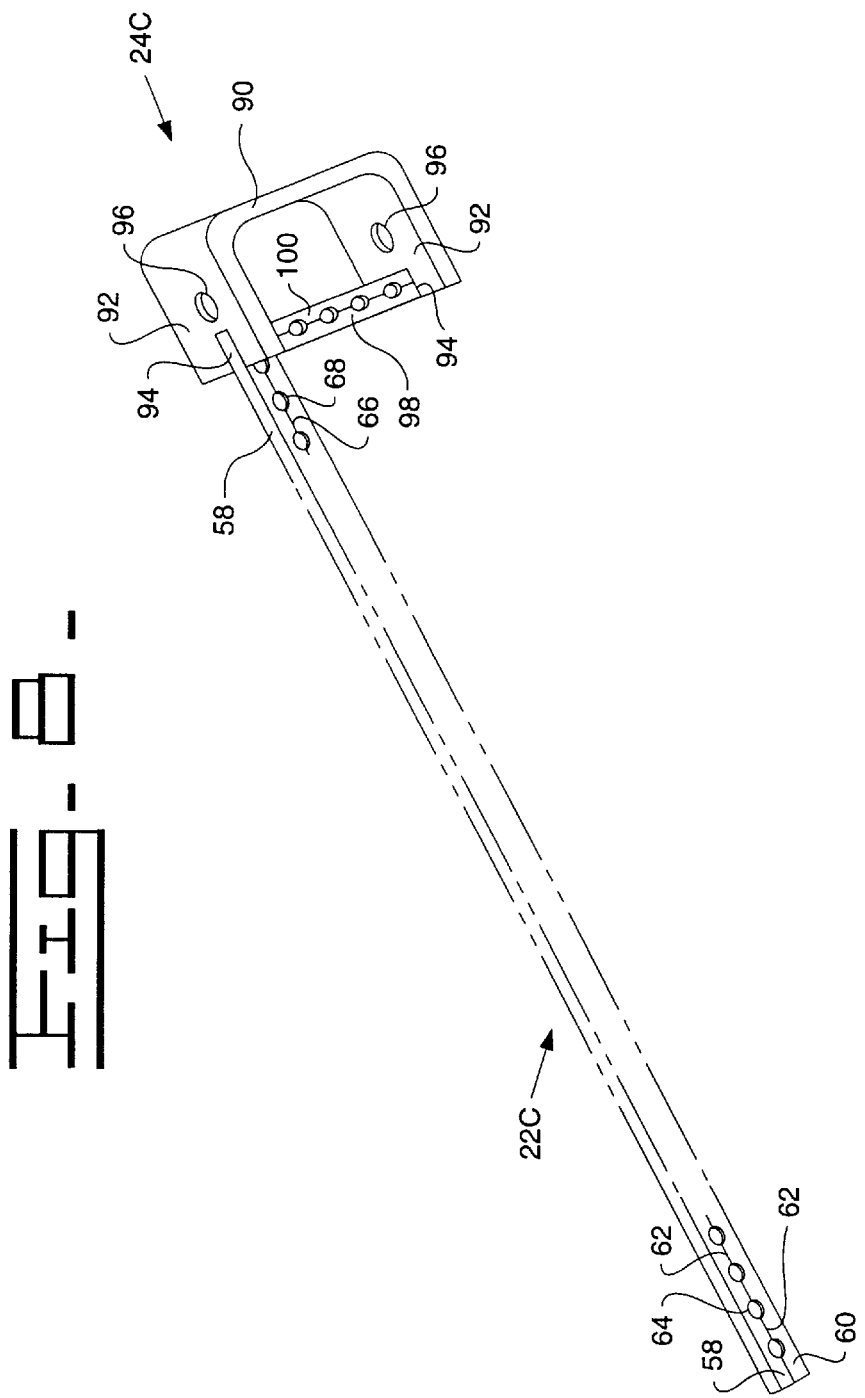
FIG. 8 is a perspective view of another alternate abutting support member according to the present invention.

Referring to FIGS. 8 and 9, a butt weld alternate main support member 22C also includes an upper rectangular bar 58 and a lower rectangular bar 60. The upper bar 58 has a plurality of upper legs 62 defining a plurality of upper recesses 64, and the lower bar 60 has a plurality of lower legs 66 defining a plurality of lower recesses 68. The upper and lower recesses 64, 68 are arcuate and preferably comprise half circles.

To assemble the butt weld main support member 22C, the recesses and legs of the bars are aligned, and the screen members 26 are positioned in the aligned pairs of recesses. The ends of the legs of the upper and lower bars are abutted, and the legs are attached with a plurality of butt welds 70. Here again, no weld is applied directly to the main screen members 26.

Referring to FIG. 10, a unitary main support member 22D utilizes a unitary rectangular bar 72 with equally spaced openings 74 formed along the longitudinal centerline of the bar 72. The openings 74 are preferably circular and are sized to slidably receive the screen members 26 therethrough. To assemble the unitary support member 22D, the screen members are guided through the openings 74 of each of the support members 22C used in the guard 20. To form the upper and lower bars 58 and 60 of the butt weld support member 22C illustrated in FIGS. 8 and 9, a unitary bar is cut in half along its longitudinal axis.

Referring to FIG. 11, a double, main support member 22E utilizes a selected pair of the previously described single support members 22A, 22B, 22C, 22D. In the embodiment shown, two lap weld support members 22A are welded to opposite sides of the perimeter support member 24, so that the pair of support members are spaced apart. The double main support member 22E provides increased stiffness and rigidity by doubling the support for the screen members 26.

Referring again to FIG. 3, the block perimeter support member 24A utilizes a rectangular block 76 having a substantially central connection bore 78 extending through the block 76 to receive a fastener (not shown). An inward face 82 of the block 76 defines a mounting slot 80 extending parallel to the bore 78. The main support member 22 is held in a top portion of the slot 80, and first and second bars 84, 86 are held in the lower portion of the slot 80. In the embodiment shown, the first and second bars 84, 86 are similar to the bars 32, 34 utilized in the lap weld main support member 22A. Alternatively, the bars 52, 54 from the edge weld main support member 22B can also be used, and if the slot is narrowed, the bars 58, 60 from the butt weld main support member 22C or the bar 72 from the unitary support member 22D can be used. Thus, it is possible to selectably interchange the types of bars used for the main and perimeter support members, and with any selection, the perimeter screen members 28 slidably extend through the perimeter openings 88 to form perimeter joints between the perimeter support member 24A and the perimeter screen members 28 without welds.

Referring to FIGS. 8 and 10, instead of using the block perimeter support member 24A of FIG. 3, a C-brace perimeter support member 24C may be utilized. The C-brace perimeter support member 24C includes a substantially symmetrical C-brace 90 having a pair of arms 92 defining open-ended slots 94. Connection apertures 96 are formed in the arms 92. The slots are centrally located and sized to receive the butt weld bars 58, 60 and the unitary bar 72 across the open mouth of the C-brace. Alternatively, the slot is widened to receive the overlapping lap weld bars 32,34 or the overlapping edge weld bars 52,54. In the embodiment of FIG. 8, the upper slot holds the upper bar 58 of the butt weld main support member 22C, and the lower slot holds butt weld inner and outer perimeter bars 98, 100. In the embodiment of FIG. 10, the upper slot holds the unitary bar 72, and the lower slot holds a unitary perimeter bar 102 having perimeter openings 103. The openings 103 (FIG. 10) and the recesses 64 and 68 (FIG. 8) are again adapted to receive the perimeter screen members 28.

Referring to FIG. 11, an alternate perimeter support member 22E uses an open block 104 preferably formed by two L-brackets. Slot shaped connection apertures 106 are formed in the top plate 108 and bottom plate 110 of the open block 104. A pair of recessed perimeter bars 112 are attached to opposite sides of a front plate 114 of the open block 104. The recessed bars 112 include a plurality of equally spaced legs 116 defining a plurality of elongated recesses 118 having rectangular portions terminating with arcuate bases. The legs 116 of the recessed bar 112 are welded to the front plate 114, so that the recesses 118 extend beyond the front plate 114 to define perimeter openings 120 to slidably receive the perimeter screen members 28. As shown, the recessed bars 112 are positioned, so that the openings are inward relative to the front plate 114. Alternatively, the recessed bars are positioned, so that the openings 120 are positioned outside the front plate 114 causing the perimeter screen members 28 to pass through the open block.

Referring again to FIG. 2, fasteners (not shown) extend through the connection bores 78, connection apertures 96, and slot shaped connection apertures 106 of the respective perimeter support members 24 and are used to attach the guard 20 to a mounting plate 122. The mounting plate 122 mounts the guard 20 over or to the desired mechanism. Alternatively, one guard is attached to another guard to enclose the mechanism.

Referring to FIGS. 1 and 2, the substantially rigid main and perimeter screen members 26, 28 preferably comprise wire screen member bodies in the configuration of concentric circles. In this regard, it is recognized and anticipated that the main screen members 26 may be assembled to their corresponding support members 22 in sections such as quarter sections whereby each concentric screen member 26 may be comprised of a plurality of such members.

Alternatively, a single spiraling wire can replace the screen members. If desired, the opposite end portions of each of the screen member sections may be welded to each other to provide additional stability to the overall guard 20 although such an arrangement is not required. If the ends of the screen members are not welded or otherwise attached, the ends of the screen members are preferably positioned adjacent to one of the support members 22, 24 or between a pair of bars of the double support member 22E so as to provide the necessary rigidity. The main screen members 26 decrease incrementally in diameter toward the center of the guard 20. If desired, a central hub or ring (not shown) can be welded to the inner ends of the support members to further strengthen the guard 20.

INDUSTRIAL APPLICABILITY

The above described guard 20 and its various embodiments have utility in all types of work machines and other vehicles were it is desired to inhibit access to mechanisms with moving or extreme temperature components. Further, the guard has utility for such mechanism independent of any vehicle or work machine. For example, the guard can be used with a standard household fan. Preferably, the support members include perimeter support members and main support members, and similar to the support members, the screen members also include perimeter screen members and main screen members. The perimeter members are positioned beyond the periphery of the fan blades, and the main members are positioned in the airflow path of the fan. The screen members are preferably concentric wire rings, which, in the case of the main screen members, decrease in diameter toward the center of the guard. The support members are preferably bars, which define the openings through which the wire screen members extend and, in the case of the main support members, extend radially from the guard center. By joining the screen members with the support members without directly applying a weld to the screen members, the operational life of the guard is increased, maintenance and repair costs are reduced, and noise emitted by the fan guard is minimized.

The various system examples shown above illustrate the fan wire guard with circumferential wire support mechanism. A user of the present invention may choose any of the above systems or an equivalent thereof, depending upon the desired application. In this regard, it is recognized that various forms of the subject fan wire guard with circumferential wire support mechanism could be utilized without departing from the spirit and scope of the present invention. As is evident from the foregoing description, certain aspects of the present invention are not limited by the particular details of the examples illustrated herein, and it is therefore contemplated that other modifications and applications will occur to those skilled in the art. For example, the structure could be arranged so that the openings are formed in the screen members or in both the screen members and the support members. Thus, the openings are formed in a selected plurality of the plurality of screen members and the plurality of support members with the other plurality extending through the openings defined in the selected plurality. It is accordingly intended that the claims shall cover all such modifications and applications that do not depart from the spirit and scope of the present invention.

Other aspects, objects and advantages of the present invention can be obtained from a study of the drawings, the disclosure and the appended claims.

What is claimed is:

1. A fan wire guard for inhibiting access to moving components of a mechanism, the guard comprising:
   a plurality of substantially rigid radial support members extending outward from a guard center;
   a plurality of perimeter support members, connected at an outer periphery of said radial support members, for attaching the guard to a mounting plate for the mechanism; and
   a plurality of circumferential wire screen members slidably extending through openings in said radial and perimeter support members.

2. The guard according to claim 1 wherein at least one of the plurality of support members comprises a first bar including a plurality of first legs defining a plurality of first recesses and a second bar attached to the first bar to define the openings within the recesses and hold the screen members in the openings.

3. The guard according to claim 2 wherein the first recesses comprise slots, and the first legs are welded to the second bar.

4. The guard according to claim 2 wherein the second bar includes a plurality of second legs aligned with and extending opposite to the first legs and the second legs defining a plurality of second recesses aligned with the first recesses to form the openings within an overlap of the first and second recesses, the first recesses comprise slots, the second recesses comprise slots, the first legs are welded to the second bar, and the second legs are welded to the first bar.

5. The guard according to claim 2 wherein the second bar includes a plurality of second legs aligned with and extending opposite to the first legs and the second legs defining a plurality of second recesses aligned with the first recesses to form the openings with a combination of the first and second recesses, the first legs include first leg ends, the second legs include second leg ends abutting the first leg ends, and the first leg ends are welded to the second leg ends.

6. The guard according to claim 5 wherein the first recesses and the second recesses comprise substantially half circles.

7. A fan wire guard for inhibiting access to moving components of a mechanism, the wire guard comprising:
- at least one substantially rigid main radial support member extending outward from a guard center;
- a plurality of circumferential wire main screen members slidably extending through openings in the main support member;
- at least one perimeter support member connected to the main support member;
- at least one perimeter screen member; and
- a perimeter joint between the perimeter screen member and the perimeter support member, the perimeter joint including at least one perimeter opening through a selected one of the perimeter screen member and the perimeter support member, and another of the perimeter screen member and the perimeter support member extending through the perimeter opening.

8. The wire guard according to claim 7 wherein the perimeter support member includes a C-brace having an open mouth, a first perimeter bar extending across the open mouth of the C-brace and the first perimeter bar having a plurality of first legs defining a first recess, and a second perimeter bar attached to the first perimeter bar to define the perimeter opening in the first recess and hold the perimeter screen member in the perimeter opening.

9. The wire guard according to claim 8 wherein the C-brace includes an upper arm defining an upper slot and a lower arm defining a lower slot, at least one of the first and second perimeter bars being held in the lower slot, and the main support member being held in the upper slot.

10. The wire guard according to claim 7 wherein the perimeter support member includes a block having an inner face, a first perimeter bar mounted on the inner face and the first perimeter bar having a plurality of first legs defining a first recess, and a second perimeter bar attached to the first bar to define the perimeter opening in the recess and hold the perimeter screen member in the perimeter opening.

11. The wire guard according to claim 10 wherein the inner face defines a mounting slot, and the first and second perimeter bars are mounted in the mounting slot.

12. The wire guard according to claim 11 wherein the main support member is mounted in the mounting slot.

13. The wire guard according to claim 7 further comprising a second substantially rigid main support member connected to the perimeter support member opposite the at least one main support member.

14. A fan wire guard for inhibiting access to moving components of a mechanism, the fan wire guard comprising:
- a plurality of first bars including a plurality of first legs defining first recesses;
- a plurality of second bars attached to the first bars to define, with the recesses, first openings through the first bars, wherein said plurality of first and second bars extend radially from a center of the guard;
- a plurality of perimeter support members, connected at an outer periphery of said bars, for attaching the guard to a mounting plate for the mechanism, said perimeter support members defining second openings; and
- a plurality of wire screen members forming concentric circles of incrementally decreasing diameter toward a center of the wire guard and extending through the first and second openings to form joints with the perimeter support members, first and second bars.

15. The wire guard according to claim 14 wherein the second bars include a plurality of second legs aligned with the first legs and defining second recesses aligned with the first recesses to define the openings through the first and second bars with the first and second recesses.

16. The wire guard according to claim 15 wherein the first legs overlap the second legs.

17. The wire guard according to claim 15 wherein the first legs abut the second legs.

18. A method of assembling a fan wire guard including a plurality of radial first bars defining first recesses, a plurality of radial second bars, and a plurality of circumferential wire screen members for inhibiting access to moving components of a mechanism, the method comprising:
- inserting the wire screen members into the first recesses of the first bars;
- attaching the second bars to the first bars to slidably hold the screen members in the first recesses; and
- attaching the guard to a mounting plate for the mechanism using a plurality of perimeter support members connected at an outer periphery of said radial bars.

19. The method according to claim 18 wherein attaching the second bars to the first bars comprises welding the second bars to the first bars.

20. The method according to claim 18 further comprising aligning the first recesses with second recesses of the second bars, and thereafter inserting the screen members in the second recesses.

21. The method according to claim 18 further comprising overlapping the first bars and the second bars.

22. The method according to claim 18 further comprising abutting the first bars and the second bars.

* * * * *